(12) United States Patent
Bahari et al.

(10) Patent No.: US 12,570,903 B2
(45) Date of Patent: Mar. 10, 2026

(54) PYROLYSIS REACTOR, PYROLYSIS SYSTEM AND METHODS OF USE THEREOF

(71) Applicants: Seyed Farshid Bahari, North Vancouver (CA); Maryam Sajadpour, Istanbul (TR); Vahideh Azizi, Istanbul (TR)

(72) Inventors: Seyed Farshid Bahari, North Vancouver (CA); Maryam Sajadpour, Istanbul (TR); Vahideh Azizi, Istanbul (TR)

( * ) Notice: Subject to any disclaimer, the term of this patent is extended or adjusted under 35 U.S.C. 154(b) by 198 days.

(21) Appl. No.: 18/402,849

(22) Filed: Jan. 3, 2024

(65) Prior Publication Data

US 2025/0188373 A1      Jun. 12, 2025

Related U.S. Application Data

(63) Continuation-in-part of application No. 18/534,645, filed on Dec. 10, 2023.

(51) Int. Cl.
 C10B 47/44 (2006.01)
 B01J 6/00 (2006.01)
 (Continued)

(52) U.S. Cl.
 CPC .............. C10B 47/44 (2013.01); B01J 6/008 (2013.01); C10B 53/07 (2013.01); C10B 57/02 (2013.01)

(58) Field of Classification Search
 CPC .......... C10B 7/10; C10B 17/00; C10B 21/08; C10B 19/00; C10B 47/44; C10B 53/07; C10B 57/02
 See application file for complete search history.

(56) References Cited

U.S. PATENT DOCUMENTS 6,534,689 B1    3/2003   Stankevitch
6,736,940 B2    5/2004   Masemore
 (Continued)

FOREIGN PATENT DOCUMENTS

EP    0643817 B1    3/1999
EP    3627050 A1    3/2020
 (Continued)

OTHER PUBLICATIONS

Dai, L., et al., "Pyrolysis technology for plastic waste recycling: A state-of-the-art review", Progress in Energy and Combustion Science 93, 2022, p. 101021.
 (Continued)

*Primary Examiner* — Renee Robinson
(74) *Attorney, Agent, or Firm* — Baumgartner Patent Law, LLC; Marc Baumgartner

(57) ABSTRACT

The present technology relates to converting plastic waste into sustainable fuels and other valuable chemicals using: (i) a pyrolysis reactor equipped with a dual fuel heating system, which is heated by electricity in a first run of pyrolysis process, and after thermal decomposition of the plastic waste, is heated by combustion a synthesis gas produced from a pyrolysis reaction, and (ii) a pyrolysis system comprising a first pyrolysis reactor and a second pyrolysis reactor operating in series, in which the second pyrolysis reactor is heated by a gas or electricity resulting from the first pyrolysis reactor; therefore, after the first pyrolysis reactor is operated, both the pyrolysis reactors can work without the need for external energy supply by burning pyrolysis products to generate heat or converting them to the electricity needed to dry waste feedstock and operate the pyrolysis reactors.

16 Claims, 6 Drawing Sheets

(51) Int. Cl.
  *C10B 53/07* (2006.01)
  *C10B 57/02* (2006.01)

(56) References Cited

U.S. PATENT DOCUMENTS

| | | | |
|---|---|---|---|
| 7,169,197 B2 | 1/2007 | Serio | |
| 8,585,868 B2 | 11/2013 | Venderbosch | |
| 8,680,349 B2 | 3/2014 | Fraczak | |
| 8,888,961 B2 | 11/2014 | Horn | |
| 10,696,904 B2 | 6/2020 | Stanley | |
| 11,299,677 B2 | 4/2022 | Ighofose | |
| 2010/0288618 A1 | 11/2010 | Feerer | |
| 2011/0124932 A1 | 5/2011 | Sarker | |
| 2011/0213188 A1 | 9/2011 | Agblevor | |
| 2017/0073584 A1 | 3/2017 | Bordynuik | |
| 2017/0114279 A1 | 4/2017 | Alyaser | |
| 2018/0010049 A1* | 1/2018 | Tenore | B01J 4/007 |
| 2021/0207033 A1 | 7/2021 | Shah | |

FOREIGN PATENT DOCUMENTS

| | | | |
|---|---|---|---|
| WO | 2002031408 A1 | 4/2002 | |
| WO | 2003104354 A1 | 12/2003 | |

OTHER PUBLICATIONS

Xayachak, T., et al., "Pyrolysis for plastic waste management: An engineering perspective", Journal of Environmental Chemical Engineering 10(6), 2022, p. 108865.

Maqsood, T., et al., "Pyrolysis of plastic species: A review of resources and products", Journal of Analytical and Applied Pyrolysis 159, 2021, p. 105295.

Al-Salem, S. M., et al., "A review on thermal and catalytic pyrolysis of plastic solid waste (PSW)", Journal of environmental management 197, 2017, pp. 177-198.

Verma, R., et al., "Toxic pollutants from plastic waste-a review", Procedia Environmental Sciences 35, 2016, pp. 701-708.

Lam, S.S. and Chase, H.A., "A review on waste to energy processes using microwave pyrolysis", Energies 5(10), 2012, pp. 4209-4232.

Tsai, W.T., et al., "Polycyclic aromatic hydrocarbons (PAHs) in bio-crudes from induction-heating pyrolysis of biomass wastes", Bioresource technology 98(5), 2007, pp. 1133-1137.

Wong, S. L., et al., "Current state and future prospects of plastic waste as source of fuel: A review", Renewable and sustainable energy reviews 50, 2015, pp. 1167-1180.

\* cited by examiner

PYROLYSIS REACTOR, PYROLYSIS SYSTEM AND METHODS OF USE THEREOF

CROSS REFERENCE TO RELATED APPLICATIONS

The present application is a continuation-in-part and claims benefit to U.S. patent application Ser. No. 18/534, 645, filed on Dec. 10, 2023, titled PYROLYSIS REACTOR, PYROLYSIS SYSTEM AND METHODS OF USE THEREOF, the contents of which are incorporated herein by reference in their entirety.

FIELD

The present technology relates to a pyrolysis reactor, system and method to recover energy from plastic waste by pyrolysis and to use electricity and heat co-generated in the process itself. It is also a system that utilizes synthesis gas from one pyrolysis reactor to heat the reactor chamber of another pyrolysis reactor.

BACKGROUND

In recent years, because of population growth and the increasing use of natural resources, we are facing an energy crisis, and energy supply is considered one of the main problems in the world. Due to the fact that fossil fuels are finite and nonrenewable, dependence on fossil fuels will become a serious problem in the near future. In addition, many environmental and health concerns have arisen due to the use of fossil fuel resources worldwide. Therefore, the utilization of renewable energy sources instead of fossil fuels and their gradual replacement will be a suitable solution to this problem. This problem can be managed by identifying sources and discovering new methods of energy production. Energy production from unused materials that are thrown away as waste is a cost-effective method that can help the environment and improve people's living conditions in many ways.

Every year, large amounts of urban and industrial solid waste is transferred to waste management centers. A large part of waste is simply buried in the outskirts of cities, which is often polluting and causes environmental problems, including the infiltration of waste leachates into underground water basins. In addition, due to the very long time of decomposition of plastic wastes, their burial causes soil pollution.

One of the methods that can be used to dispose of urban and industrial wastes is thermal decomposition, which mainly includes incineration, pyrolysis and gasification. The incineration process involves the combustion of solid waste at high temperatures in the presence of oxygen. On the other hand, pyrolysis is the thermal decomposition of waste into gas and solid phases in the absence of oxygen.

Incineration of plastic waste releases toxic pollutants like dioxins and furans into the atmosphere, and poses a threat to the health of humans, animals, and plants. Meanwhile, pyrolysis of plastic waste produces mainly a solid fraction (char) and a volatile fraction that can be separated into condensable hydrocarbon oil and a non-condensable high calorific value gas. The pyrolysis technology solves the problems associated with landfills and also the burning of waste by converting solid waste into fuel and valuable products. The advantages of this process include the lower operating temperature of the pyrolysis furnace compared to the incinerator furnace and a wider variety of feedstocks that can be processed by pyrolysis. Therefore, pyrolysis has more ability to adapt to the conditions than the waste incinerator.

The pyrolysis process depends on variables such as the type and size of input waste, the rate of decomposition during heating, the heat flow gradient, and the energy supply. In some regions hydrocarbon fuels may not be used, and a device capable of using other energy sources such as electricity is used. Meanwhile, in remote areas, electricity is not available and only hydrocarbon fuels can be used. Therefore, the consumer of the device faces the problem of energy supply depending on his local conditions.

There are different methods for saving energy and increasing the efficiency of the pyrolysis process. For example, WO2002/031408 discloses a process for the generation of energy achieved by expanding burnt gas in the turbine of one of more turboalternators, this gas being pyrolysis gas produced in one or more pyrolysis reactors in which solid waste is subjected to a pyrolytic process providing thermal energy to the pyrolysis reactors themselves. Boilers for heat recovery with heated or vaporized fluid and/or exchangers which use the exhaust gases for preheating the oxidant air as it leaves the compressor of the turbine and before it enters the combustion chamber are positioned downstream of the pyrolysis reactors. In the process in question, the said thermal energy is wholly or partly recovered by bringing about heat exchange between the said one or more pyrolysis reactors and the exhaust gases downstream from the said one or more turboalternators.

U.S. Pat. No. 6,736,940 discloses tire pyrolysis systems and processes which include feeding tire shreds to a pyrolysis reactor, pyrolyzing the shreds in a pyrolysis reactor to produce a hydrocarbon-containing gas stream and carbon-containing solid, removing the carbon-containing solid from the reactor, directing the hydrocarbon-containing gas stream into a separator, contacting the hydrocarbon-containing gas stream with an oil spray in the separator thereby washing particulate from the hydrocarbon-containing gas stream and condensing a portion of the gas stream to oil, removing and cooling the oil from the separator, directing non-condensed gas from the gas stream away from the separator, and directing a portion of the cooled oil removed from the separator to an inlet of the separator for use as the separator oil spray. A process is also provided in which solids from the pyrolysis reactor are directed to an auger having a pressure which is greater than the pressure in the pyrolysis reactor, and in which non-condensed gas from the gas stream after condensing a portion of the gas is directed to at least one burner in heat exchange relation with the pyrolysis reactor, and burned to heat the reactor and generate an effluent flue gas, a portion of which effluent flue gas is cooled and injected into the auger which is a trough auger in one embodiment.

U.S. Patent Application Publication No. 2021/0207033 discloses a pyrolysis reaction system, the system comprising: a pyrolysis chamber comprising a feed inlet, a gas inlet and a product outlet, wherein the pyrolysis chamber is configured i) to receive a pyrolyzable organic feed and an inert gas via the feed inlet and gas inlet respectively, ii) to pyrolyze the organic feed at a pyrolysis temperature to produce a carbonaceous pyrolysis product and a pyrolysis gas, wherein the pyrolysis gas will combine with the inert gas to form a gas mixture having a pyrolysis chamber pressure in the pyrolysis chamber, and iii) to discharge the carbonaceous pyrolysis product via the product outlet; a gas reactor configured to react the pyrolysis gas by combustion and/or carbon deposition at a gas reaction temperature and a gas reactor pressure; and a first partition defining a boundary between the pyrolysis chamber and the gas reactor, the first partition comprising a plurality of first apertures to provide fluid communication between the pyrolysis chamber and the gas reactor, wherein the pyrolysis reaction system is operable with the gas reactor pressure less than the pyrolysis chamber pressure such that the gas mixture flows from the pyrolysis chamber to the gas reactor through the first apertures, thereby providing at least a portion of the pyrolysis gas for reaction in the gas reactor.

U.S. Patent Application Publication No. 2017/0114279 discloses several pyrolysis reactor configurations and associated methods for generating pyrolysis products (e.g., oil, gas, and/or char) from organic feedstock. The pyrolysis reactor generally consists of an upper pressure vessel and a lower reaction chamber. The pyrolysis reaction occurs in the upper pressure vessel, lower reaction chamber, or both using the organic feedstock contained therein. A heating gas is introduced into the upper pressure vessel, lower reaction chamber, or both by way of gas inlets. The heating gas may be the process gas, or a combustion product thereof, that is produced by the pyrolysis reactor itself. Other suitable heating gases include, for example, natural gas (e.g., methane).

EP 3627050 describes a pyrolysis plant comprising an exhaust heated feeder, a reactor, a rotary screen cleaning tower, an exhaust heat fuel cleaner, a safety burner, a carbon refiner and the support devices and all fixtures as piping and valves needed to run the plant. A gas burner with dual inlets is used to heat the reactor. One gas will be for start-up and the other inlet to the burner is for syngas. The syngas passes through a set of bubblers to scrub the sulphur and other absorbable chemicals out of the gas stream. The cleaned syngas is used to power the reactor burners and can also be used to power a generator.

However, there is a need for developing a pyrolysis reactor equipped with a hybrid heating system, that can meet its heating needs according to the local facilities to access any of the energy sources (fossil fuel or electric energy) and in which the pyrolysis products and excess heat produced in the pyrolysis reactor are used to heat the pyrolysis reactor itself or another reactor. It would be preferable if it was scalable.

SUMMARY

The present technology provides a hybrid heater pyrolysis reactor. It is scalable and is therefore suitable for commercial and residential use. The pyrolysis reactor can be used to treat materials that are capable of producing pyrolytic oils in the absence of oxygen at temperatures of about 400° C. to about 800° C.

The present technology relates to thermochemical recycling of plastic waste and the production of fuel and valuable chemicals using a pyrolysis reactor equipped with a dual heating system, which is heated by electricity in a first run of pyrolysis and after thermal decomposition of the plastic waste, is heated by burning a synthesis gas leaving the pyrolysis reactor in a second run of pyrolysis. It also relates to a pyrolysis system comprising a first pyrolysis reactor and a second pyrolysis reactor operating in series, in which the second pyrolysis reactor is heated by a gas or electricity produced by the first pyrolysis reactor. The pyrolysis reactor and the pyrolysis system can meet their heating needs by accessing fossil fuel or electricity as the energy source. In addition, the pyrolysis reactor and the pyrolysis system can play an effective role in preserving the environment by converting waste materials into energy and valuable compounds. Specifically, this technology provides a highly reliable, highly efficient, and adaptable method for pyrolysis of plastic waste.

In one embodiment, a method of pyrolyzing shredded solid waste is provided, the method comprising:

selecting a hybrid heat pyrolysis reactor, which includes: a heater; a feeder which is in communication with the heater; a reactor chamber, which is connected to the feeder and includes walls with a refractory liner, a waste inlet, a solid residue outlet, a synthesis gas outlet pipe, a hot gas outlet, and an auger, which includes a shaft configured for heating the shredded solid waste; a condenser which includes a pyrolytic oil outlet and a non-condensable synthesis gas outlet; a collection vessel in fluid communication with the non-condensable synthesis gas outlet; a pipe in fluid communication with the collection vessel; a fuel burner in fluid communication with the pipe and the reactor chamber; and a hot gas supply duct which is in fluid communication with the hot gas outlet and the feeder;

heating the shredded solid waste in the feeder with the heater to provide heated shredded solid waste;

loading the heated shredded solid waste into the reactor chamber through the waste inlet;

pyrolyzing the heated shredded solid waste in the reactor chamber to provide pyrolyzed solid waste; and concomitantly separating synthesis gas and solid residue into two streams from the pyrolyzed solid waste, condensing the synthesis gas in the condenser to provide pyrolysis oil and non-condensable synthesis gas, sending the hot gas from the hot gas outlet to the feeder via the hot gas supply line; and sending the non-condensable synthesis gas to the fuel burner, thereby pyrolyzing shredded solid waste.

The method may further comprise pyrolyzing shredded solid waste in subsequent runs, the method comprising:

heating the shredded solid waste in the feeder with hot gas from the reactor chamber to provide heated shredded solid waste;

loading the heated shredded solid waste into the reactor chamber through the waste inlet;

sending the non-condensable synthesis gas to the fuel burner;

pyrolyzing the heated shredded solid waste in the reactor chamber with the fuel burner to provide pyrolyzed solid waste; and concomitantly separating synthesis gas and solid residue into two streams from the pyrolyzed solid waste, condensing the synthesis gas in the condenser to provide pyrolysis oil and non-condensable synthesis gas, sending the hot gas from the hot gas outlet to the feeder via the hot gas supply line and sending the non-condensable synthesis gas to the fuel burner, thereby pyrolyzing solid waste.

In the method, the heating of the feeder may initially be with an electric heater and thereafter with the hot gas.

In the method, the heating in the reactor chamber may initially be electric heating and thereafter by burning the non-condensable synthesis gas in the fuel burner.

In the method, the heating of the feeder may initially be with a feeder fuel burner using an external fuel source.

In the method, the heating of the shredded solid waste in the feeder may be at 80° C. to at least 100° C.

In the method, the shredded solid waste may be continuously loaded in the feeder, the heated shredded solid waste may be continuously loaded into the reactor chamber, the pyrolyzing the heated shredded solid waste may be continuous and the concomitantly separating synthesis gas and solid residue into two streams from the pyrolyzed solid waste, condensing the synthesis gas in the condenser to provide pyrolysis oil and non-condensable synthesis gas may be continuous.

In the method, the pyrolyzing may be conducted at 400° C. to 800° C.

In the method, the shredded solid waste may be shredded plastic polymeric solid waste.

In the method, the heating of the reactor chamber may be via the auger which has a hollow bore in fluid communication with the fuel burner.

In another embodiment, a system is provided for pyrolyzing shredded solid waste, the system comprising a first pyrolysis reactor and at least a second pyrolysis reactor in series, each reactor including:

a heater; a feeder which is in communication with the heater; a reactor chamber, which is connected to the feeder and includes walls with a refractory liner, a waste inlet, a solid residue outlet, a synthesis gas outlet pipe, a hot gas outlet, and an auger, which includes a shaft configured for heating the shredded solid waste; a condenser which includes a pyrolytic oil outlet and a non-condensable synthesis gas outlet; a pipe in fluid communication with the non-condensable synthesis gas outlet; a fuel burner in fluid communication with the pipe and the reactor chamber; and a hot gas supply duct which is in fluid communication with the hot gas outlet and the feeder;

wherein in the first pyrolytic reactor, the shaft of the auger has a first end and a second end and the ends are attached to electrical connections, and the pipe is in fluid communication with the fuel burner of the second pyrolytic reactor; and wherein in the second pyrolysis reactor, the shaft of the auger is hollow and is in fluid communication with the fuel burner.

In the system, the second pyrolysis reactor may further include a thermoelectric generator or micro-gas turbine which is in fluid communication with the pipe from the non-condensable synthesis gas outlet and is in electrical communication with the reactor chamber of the second pyrolysis reactor.

In another embodiment, a method of pyrolyzing shredded solid waste is provided, the method comprising:

selecting the pyrolysis system described above;

heating the shredded solid waste in the feeders with the heaters to provide heated shredded solid waste;

loading the heated shredded solid waste into the reactor chambers through the waste inlets;

pyrolyzing the heated shredded solid waste in the reactor chambers with the shafts to provide pyrolyzed solid waste; and concomitantly separating synthesis gas and solid residue into two streams from the pyrolyzed solid waste, condensing the synthesis gas in the condenser to provide pyrolysis oil and non-condensable synthesis gas, sending the hot gas from the hot gas outlets to the feeders via the hot gas supply lines; sending the non-condensable synthesis gas from the first pyrolysis reactor to the fuel burner of the second pyrolytic reactor, and the fuel burner heating the hollow core of the auger of the second pyrolysis reactor, thereby pyrolyzing solid waste.

In the method, the heating of at least one feeder may be with an electric heater.

In the method, the heating of at least one feeder may be with a fuel burner.

In the method, the heating of the shredded solid waste in the feeders may be at 80° C. to at least 100° C.

In the method, the heating in the reactor chamber of the first pyrolysis reactor may be electric heating with the shaft.

In the method, powering the electric heating of the shaft of the reactor chamber of the first pyrolysis reactor may be by the thermoelectric generator or the micro-gas turbine of the second pyrolysis reactor.

In the method, electrical powering the reactor chamber of the second pyrolysis reactor may be by the thermoelectric generator or the micro-gas turbine of the second pyrolysis reactor.

In one embodiment, a method of pyrolyzing shredded solid waste is provided, the method comprising:

selecting a pyrolysis reactor, which includes: a heater; a feeder which is in communication with the heater; a reactor chamber, which is connected to the feeder and includes walls with a refractory liner, a waste inlet, a solid residue outlet, a synthesis gas outlet pipe, a hot gas outlet, and an auger, which includes a shaft configured for heating the shredded solid waste; a condenser which includes a pyrolytic oil outlet and a non-condensable synthesis gas outlet; a collection vessel in fluid communication with the non-condensable synthesis gas outlet; a pipe in fluid communication with the collection vessel; a fuel burner in fluid communication with the pipe and the reactor chamber; and a hot gas supply duct which is in fluid communication with the hot gas outlet and the feeder;

heating the shredded solid waste in the feeder with the heater to provide heated shredded solid waste;

loading the heated shredded solid waste into the reactor chamber through the waste inlet;

pyrolyzing the heated shredded solid waste in the reactor chamber with the shaft to provide pyrolyzed solid waste; and concomitantly separating synthesis gas, solid residue and hot gas into three streams from the pyrolyzed solid waste, condensing the synthesis gas in the condenser to provide pyrolysis oil and non-condensable synthesis gas, sending the hot gas from the hot gas outlet to the feeder via the hot gas supply line; and-transiently storing the non-condensable synthesis gas, to provide transiently stored non-condensable synthesis gas, thereby pyrolyzing shredded solid waste.

The method may further comprise pyrolyzing shredded solid waste in subsequent runs, the method comprising:

heating the shredded solid waste in the feeder with hot gas from the reactor chamber to provide heated shredded solid waste;

loading the heated shredded solid waste into the reactor chamber through the waste inlet;

releasing the transiently stored non-condensable synthesis gas to the fuel burner;

pyrolyzing the heated shredded solid waste in the reactor chamber with the fuel burner to provide pyrolyzed solid waste; and concomitantly separating synthesis gas, solid residue and hot gas into three streams from the pyrolyzed solid waste, condensing the synthesis gas in the condenser to provide pyrolysis oil and non-condensable synthesis gas, sending the hot gas from the hot gas outlet to the feeder via the hot gas supply line and sending the non-condensable synthesis gas to the fuel burner, thereby pyrolyzing solid waste.

In the method, the heating of the feeder may be with an electric heater.

In the method, the heating of the feeder may be with a fuel burner.

In the method, the heating of the shredded solid waste in the feeder may be at 80° C. to at least 100° C.

In the method, the heating in the reactor chamber may be electric heating with the shaft.

In the method, pyrolyzing may be conducted at 400° C. to 800° C.

In the method, the shredded solid waste may be shredded plastic polymeric solid waste.

In another embodiment a system for pyrolyzing shredded solid waste is provided, the system comprising a first pyrolysis reactor and at least a second pyrolysis reactor in series, each reactor including:

a heater; a feeder which is in communication with the heater; a reactor chamber, which is connected to the feeder and includes walls with a refractory liner, a waste inlet, a solid residue outlet, a synthesis gas outlet pipe, a hot gas outlet, and an auger, which includes a shaft configured for heating the shredded solid waste; a condenser which includes a pyrolytic oil outlet and a non-condensable synthesis gas outlet; a pipe in fluid communication with the non-condensable synthesis gas outlet; a fuel burner in fluid communication with the pipe and the reactor chamber; and a hot gas supply duct which is in fluid communication with the hot gas outlet and the feeder;

wherein in the first pyrolytic reactor, the shaft of the auger has a first end and a second end and the ends are attached to electrical connections, and the pipe is in fluid communication with the fuel burner in the second pyrolytic reactor; and wherein in the second pyrolysis reactor, the shaft of the auger is hollow and is in fluid communication with the fuel burner.

In the system, the second pyrolysis reactor may further include a thermoelectric generator or micro-gas turbine which is in fluid communication with the pipe from the condenser.

In another embodiment, a method of pyrolyzing shredded solid waste is provided, the method comprising:

selecting the pyrolysis system described above;

heating the shredded solid waste in the feeders with the heaters to provide heated shredded solid waste;

loading the heated shredded solid waste into the reactor chambers through the waste inlets;

pyrolyzing the heated shredded solid waste in the reactor chambers with the shafts to provide pyrolyzed solid waste; and concomitantly separating synthesis gas, solid residue and hot gas into three streams from the pyrolyzed solid waste, condensing the synthesis gas in the condenser to provide pyrolysis oil and non-condensable synthesis gas, sending the hot gas from the hot gas outlets to the feeders via the hot gas supply lines; sending the non-condensable synthesis gas from the first pyrolysis reactor to the fuel burner of the second pyrolytic reactor, and the fuel burner heating the hollow core of the auger of the second pyrolysis reactor, thereby pyrolyzing solid waste.

In the method, the heating of at least one feeder may be with an electric heater.

In the method, the heating of at least one feeder may be with a fuel burner.

In the method, the heating of the shredded solid waste in the feeders may be at 80° C. to at least 100° C.

In the method, the heating in the reactor chamber of the first pyrolysis reactor may be electric heating with the shaft.

In another embodiment, a method of pyrolyzing shredded solid waste is provided, the method comprising:

selecting the pyrolysis system that includes the thermoelectric generator or micro-gas turbine;

heating the shredded solid waste in the feeders with the heaters to provide heated shredded solid waste;

loading the heated shredded solid waste into the reactor chambers through the waste inlets;

pyrolyzing the heated shredded solid waste in the reactor chambers with the shafts to provide pyrolyzed solid waste; and concomitantly separating synthesis gas, solid residue and hot gas into three streams from the pyrolyzed solid waste, condensing the synthesis gas in the condenser to provide pyrolysis oil and non-condensable synthesis gas, sending the hot gas from the hot gas outlets to the feeders via the hot gas supply lines; sending the non-condensable synthesis gas from the first pyrolysis reactor to the fuel burner of the second pyrolytic reactor, and the fuel burner heating the hollow core of the auger of the second pyrolysis reactor, thereby pyrolyzing solid waste.

In the method, powering the electric heating of the shaft of the first pyrolysis reactor may be by the thermoelectric generator or the micro-gas turbine of the second pyrolysis reactor.

In the method, the electrical powering the reactor chamber of the second pyrolysis reactor may be by the thermoelectric generator or the micro-gas turbine of the second pyrolysis reactor.

The present technology relates to a process of energy recovery from plastic waste using a pyrolysis reactor equipped with a hybrid heating system. The technology is intended to replace electric energy instead of fossil fuel and vice versa in cases where access to one of these energy sources (fossil fuel or electric energy) is not available. More specifically, the process is energy-efficient, as pyrolysis gases produced during the process are used for heating the pyrolysis reactor.

The present technology provides a process for converting plastic waste into fuels and valuable chemicals using a pyrolysis reactor equipped with a hybrid heating system. The pyrolysis reactor is initially heated by electrical elements or by burning fossil fuels until the thermal decomposition of the plastic waste takes place and a synthesis gas is produced in sufficient quantities. The reactor is then heated by burning the synthesis gas or by electricity generated from this gas, which results in reduced energy consumption.

Continuous operation is carried out by continuous feeding of waste into the pyrolysis reactor. The pyrolysis reactor can meet its heating needs according to the local facilities to access any of the energy sources (fossil fuel or electric energy). In addition, the pyrolysis reactor can play an effective role in preserving the environment by converting waste materials into energy and valuable chemical compounds. Specifically, this technology provides a high-reliability, high-efficiency, and adaptable process for pyrolysis of plastic waste.

In accordance with another alternative embodiment, the technology provides a process for converting plastic waste into sustainable fuels and other valuable chemicals using a pyrolysis reactor chamber equipped with a hybrid heating system and insulated by a thermal jacket, wherein the pyrolysis reactor chamber is lined on its inside by a refractory material and comprises a waste inlet, a solid product outlet, a gas outlet, and a screw comprising a hollow shaft and a helical flight arranged about the shaft and extending between two ends of the shaft; the process comprising:

(a) preheating waste shreds in a screw feeder;

(b) introducing the waste shreds into the pyrolysis reactor chamber that is heated by electrical elements located on an outer wall of the reactor or by burning fossil fuels in a burner;

(c) pyrolyzing the waste shreds at a temperature to produce a solid residue and a synthesis gas;

(d) discharging the solid residue from the pyrolysis reactor chamber and rapidly cooling it via a cooling screw;

(e) passing the synthesis gas through a catalyst tower, a condenser, a buffer tank, and a cooling system, respectively, to separate liquid products (oils having different boiling points) from non-condensable gases;

(f) directing the non-condensable gases to the burner and passing a hot flue gas produced by burning the non-condensable gases through the hollow shaft and thereby providing thermal energy required to heat the pyrolysis reactor chamber; and (g) directing the hot flue gas exiting from the pyrolysis reactor chamber to a cylindrical space between the pyrolysis reactor chamber and the thermal jacket and then to the screw feeder.

In some embodiments of the technology, the process further comprises introducing the hot flue gas exiting from the screw feeder into a scrubber.

In some embodiments of the technology, the waste shreds are preheated in the screw feeder to a temperature close to 100° C. In some embodiments of the technology, the waste shreds are loaded into the pyrolysis reactor chamber through a rotary valve. In some embodiments of the technology, the solid residue is discharged from the pyrolysis reactor chamber through a rotary valve. In some embodiments of the technology, the temperature is set in the range of 400° C. to 800° C.

In accordance with a yet another embodiment, the technology provides a process for converting plastic waste into sustainable fuels and other valuable chemicals using a pyrolysis reactor chamber equipped with a hybrid heating system and insulated by a thermal jacket, wherein the pyrolysis reactor chamber is lined on its inside by a refractory material and comprises a waste inlet, a solid product outlet, a gas outlet, and a screw comprising a hollow shaft and a helical flight arranged about the shaft and extending between two ends of the shaft; the process comprising:

(a) preheating waste shreds in a screw feeder;

(b) introducing the waste shreds into the pyrolysis reactor chamber that is heated by electrical elements located on an outer wall of the reactor or by burning fossil fuels in a burner;

(c) pyrolyzing the waste shreds at a temperature to produce a solid residue and a synthesis gas;

(d) discharging the solid residue from the pyrolysis reactor chamber and rapidly cooling it via a cooling screw;

(e) passing the synthesis gas through a catalyst tower, a condenser, a buffer tank, and a cooling system, respectively, to separate liquid products (oils having different boiling points) from non-condensable gases;

(f) directing the non-condensable gases to a gas turbine and then a generator to generate electrical energy needed for heating elements of the pyrolysis reactor chamber; and (g) directing hot exhaust gases from the gas turbine to a cylindrical space between the pyrolysis reactor chamber and the thermal jacket and then to the screw feeder.

In some embodiments of the technology, the process further comprises introducing the hot exhaust gases from the screw feeder into a scrubber.

In some embodiments of the technology, the waste shreds are preheated in the screw feeder to a temperature close to 100° C. In some embodiments of the technology, the waste shreds are loaded into the pyrolysis reactor chamber through a rotary valve. In some embodiments of the technology, the solid residue is discharged from the pyrolysis reactor chamber through a rotary valve. In some embodiments of the technology, the temperature is set in the range of 400° C. to 800° C.

BRIEF DESCRIPTION OF DRAWINGS

The objects and features of the present technology will become more fully apparent from the following description, taken in conjunction with the accompanying drawings. Understanding that these drawings depict only typical embodiments of the technology and are, therefore, not to be considered limiting of its scope, the technology will be described and explained with additional specificity and detail through the use of the accompanying drawings in which.

DESCRIPTION

Figure 1:
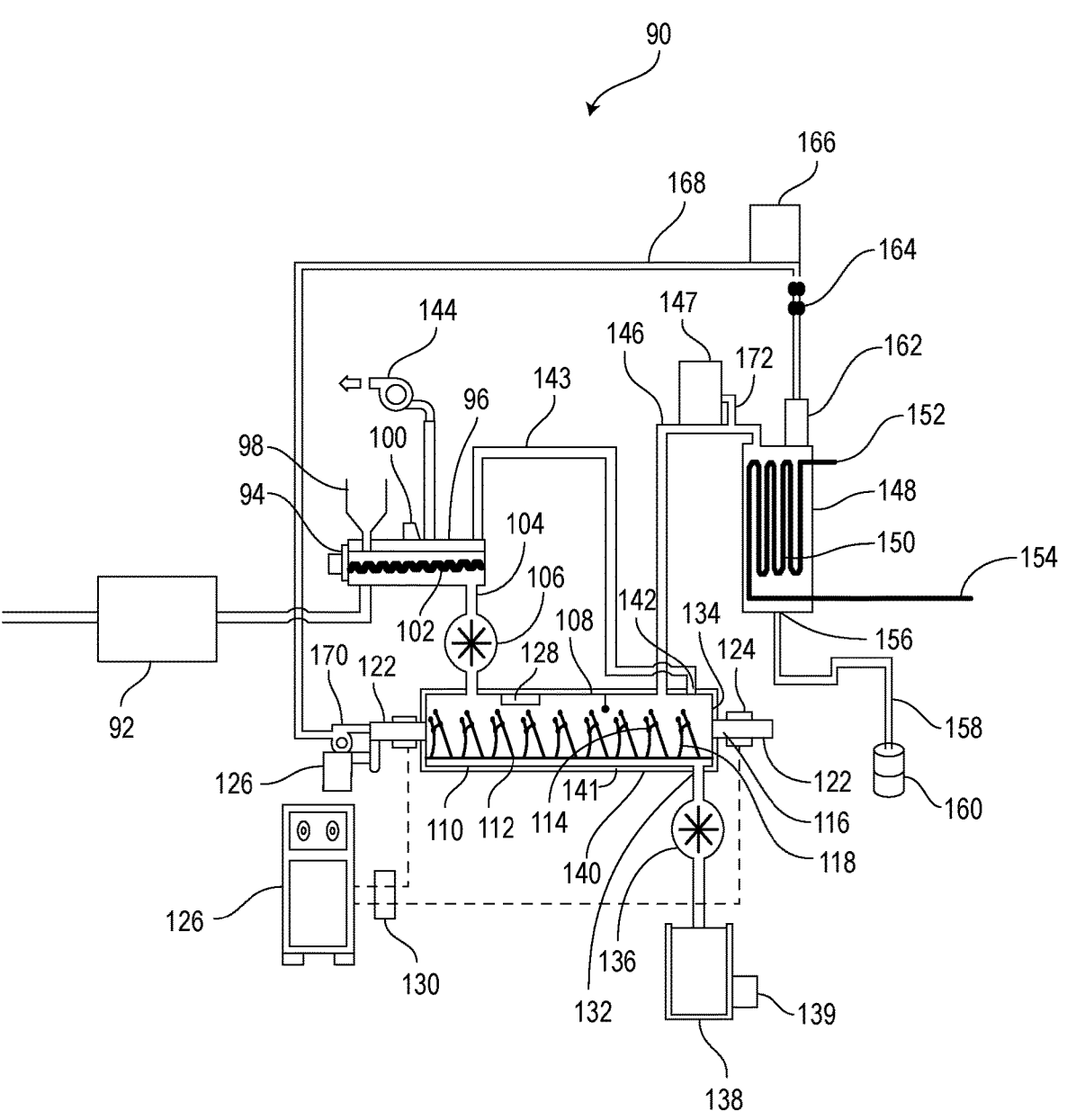
FIG. 1 is a schematic view of an electrical pyrolysis reactor.

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Definition

Shredded—in the context of the present technology, shredded simply means that the solid material is broken into small pieces by, for example, but not limited to shredding, cutting, grinding, granulating, macerating or stripping.

DETAILED DESCRIPTION

The present technology provides a pyrolysis reactor equipped with a hybrid heating system, which is heated by electricity during the first run of pyrolysis and after the thermal decomposition of plastic waste, it is heated by combustion of a synthesis gas leaving the pyrolysis reactor, resulting in optimization of energy consumption. The pyrolysis reactor overcomes the problem of access to energy depending on local conditions. It is heated by hydrocarbon fuels wherever they are available, and it is heated by electricity wherever it is not possible to use hydrocarbon fuels. Feedstock for the pyrolysis reactor is generally plastic waste. The plastic waste must first be crushed into smaller particles before entering the pyrolysis reactor.

Figure 2:
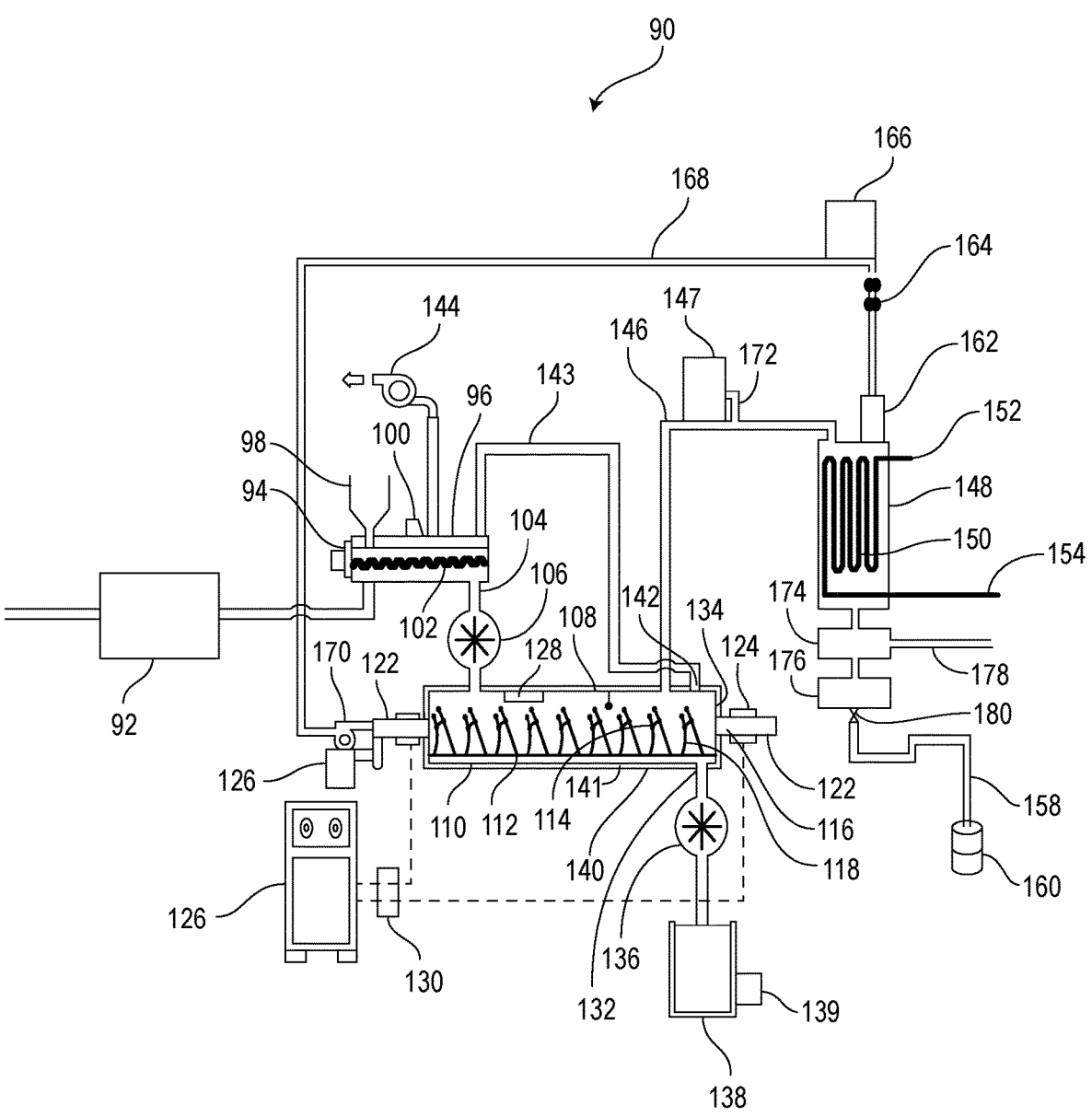
FIG. 2 is a schematic view of an alternative embodiment of FIG. 1.

FIG. 1 is a schematic view of a pyrolysis reactor, generally referred to as 90. A power supply 92, which includes a power inverter, is attached to an electric heater 94 for a feeder 96. The power supply 92 provides the energy necessary to heat the shredded solid waste in the feeder 96. In another embodiment, the heater 94 is a fuel burner. The outlet 104 leads to a rotary valve 106 which leads to a reactor chamber 108. The reactor chamber 108 has walls 110 with a refractory liner 112. Housed in the bore defined by the walls 110 is an auger 114 which includes a shaft 116 and a helical blade 118 which extend the length of the reactor chamber 108. In one embodiment, the shaft 116 defines a bore that is in fluid communication with the fuel burner 94. The two ends 122 of the shaft 116 extend outward from the reactor chamber 108. Both have air cooling fins. In an alternative embodiment a liquid cooling system cools the shafts 116. The two ends 122 of the shaft 116 are connected to a set of brushes or electrical connections 124 which are connected to two poles of the power supply 92, such that the auger is configured to be a heater. One end 122 is attached to a motor and gear box unit 126. The power inverter is utilized to change and control the voltage and frequency of the power supply. A set of temperature sensors 128 are used to monitor and control the temperature. The power delivered to the shaft 122 is regulated by an electronic thyristor dimmer 130 as a function of a programmed desired temperature. In an alternative embodiment, electrical elements are housed on the walls 110. A solid waste outlet 132 is located proximate to the downstream end 134 of the reactor chamber 108. It connects to a rotary valve 136 which leads to a tank 138. In one embodiment, there is a cooler between the tank 138 and the rotary valve 136. A cooler 139 is connected to the tank 138. A thermal jacket 140 forms the outermost layer of the reactor chamber 108 to define a space 141 between the walls 110 and the thermal jacket 140. A hot gas outlet 142 is located on an upper region extending through the thermal jacket 140 to the space 141, proximate the downstream end 136. A hot gas duct 143 connects the hot gas outlet 142 of the reactor chamber 108 to the feeder 96. An extractor fan 144 is in fluid communication with the feeder 96. A synthesis gas outlet pipe 146 is located on an upper region of the reactor chamber 108 proximate to the downstream end 136. The synthesis gas outlet pipe 146 leads to a catalyst tower 147 and then to a condenser 148 which includes vertically disposed tubes 150 having an inlet 152 and an outlet 154 for refrigerant. The vertical arrangement of the tubes 150 promotes rapid cooling of the synthesis gas during the condensation process. In addition, the tubes 150 are cleaned by the condensates that drip on them. A valve 156 is installed at a bottom end of the condenser 148, which is connected to a discharge pipe 158 which in turn is attached to a tank 160. An outlet 162 extends from the condenser 148 to a suction fan 164 then to a collection vessel 166. A pipe 168 extends between the collection vessel 166 to a gas burner 170 that supplies heat to the reactor chamber 108. The catalyst tower 147 has an outlet 172 for discharging high molecular weight sludge. In one embodiment, shown in FIG. 2, a tank 174 is disposed between the condenser 148 and a separator 176. The tank 174 includes an outlet 178. The separator 176 has a valve 180 at the bottom of the separator 176 which then is connected to the discharge pipe 158.

In use, during a first run, the first load of shredded solid waste enters the feeder 96. In one embodiment, the first load of shredded solid waste is electrically heated by the electric heater 94 while being transferred along the length of the screw conveyor 102. In an alternative embodiment, the heater 94 is a fuel burner. In another embodiment, both an electric heater and a fuel burner are present. The first load of the shredded solid waste is heated in the feeder 96 to a temperature of at least 80° C. and preferably 100° C. The first load of the shredded solid waste passes through the screw conveyor 102 to reach the outlet 104 and enters the reactor chamber 108 through the rotary valve 106. The rotary valve 106 is used to direct the first load of the shredded solid waste from upstream to downstream, while preventing oxygen from entering the reactor chamber 108. During the pyrolysis process, the first load of the shredded solid waste in the reactor chamber 108 is converted into a synthesis gas and a solid residue as it is heated by the shaft 116 while it is urged to the downstream end 136 by the blades 118 of the auger 114. Once the first load enters the reactor chamber 108, the shredded solid waste is continuously added to the reactor chamber 108.

Depending on conditions, the temperature of the reactor chamber 108 is set in the range of 400° C. to 800° C. The refractory liner 112 radiates heat back into the first load of shredded solid waste to improve efficiency. The residence time of the shredded solid waste inside the reactor chamber 108 depends on the rotation speed of the auger 114.

The first load of shredded solid waste, which in the preferred embodiment is a plastic polymeric material, first softens and melts inside the reactor chamber 108, and after completion of the pyrolysis reaction, the synthesis gas and the solid residue are removed from the reactor 108. The shredded solid waste is continuously loaded. The synthesis gas has a high calorific value and can be used as a fuel. The solid residue can be utilized as a raw material for the production of, for example, but not limited to concrete and bricks. If this solid residue is processed, it turns into a high-quality carbon black. In addition, the solid residue can be used as a soil improver to increase the availability of nutrients for plants.

The rotary valve 136 removes the solid residue obtained from the thermal decomposition of the first load of shredded solid waste from the reactor chamber 108. Since the temperature of the solid residue exiting the reactor chamber 108 is still high, this rotary valve 136 is connected to the cooler 139. A liquid cooling circuit can be used for rapid cooling of the solid residue, so that it is cooled to room temperature. The solid residue is collected and stored in a tank 138.

The synthesis gas outlet pipe 146 of the reactor chamber 108 directs the synthesis gas from the reactor chamber 108 to the catalyst tower 147 and then to the condenser 148. The condenser 148 is used to separate condensable components of the synthesis gas. As the synthesis gas enters the condenser 148, it is cooled through tubes 150 in which a refrigerant fluid flows. A spray cleaning system containing soda water can be used to clean the synthesis gas.

The valve 156 and discharge pipe 158 allow the pyrolytic oil to be collected and stored in the tank 160. The temperature of the pyrolytic oil in the tank 160 is about 50° C.

A non-condensable part of the synthesis gas is removed from the condenser 148 through the outlet 162 to be reused by the gas burner 170 to heat the reactor chamber 108. During the first pyrolysis run, the non-condensable synthesis gas is collected in collection vessel 166 and transiently stored. Thereafter, it is drawn through the pipe 168 by the suction fan 164 and enters the gas burner 170 to supply heat to the reactor chamber 108. Once the first load of shredded solid waste has generated the non-condensable part of the synthesis gas, the reactor chamber 108 is heated by the gas burner 170, by urging flue gas through the bore of the 116 of the auger 114, thereby reducing the amount of electricity or externally provided fuel needed for heat generation. Further, in order to optimally use the energy available in the reactor chamber 108, excess heat (hot gas) generated in the reactor chamber 108 is used to preheat solid waste in the next run of pyrolysis. For this purpose, after operating the reactor chamber 108, the heat coming out of the reactor chamber 108 is transferred into the feeder 96 through the hot gas outlet 142 and hot gas supply duct 143. The hot gas exiting from the hot gas supply duct 143 absorbs moisture of the solid waste inside the feeder 96. For this reason, the extractor fan 144 is used to extract moisture from the feeder 96. In one embodiment, the flue gas is directed to the space 141 between the wall 110 and the thermal jacket 140 of the reactor chamber 108, and is then further routed to the feeder 96.

The present technology opens a perspective in the field of energy and renewable fuels. The pyrolysis reactor 90 described in this technology has a relatively simple structure and at the same time overcomes the drawbacks of conventional pyrolysis methods, for example, but not limited to high fuel consumption. In the present technology, it is possible to save energy by direct combustion of the synthesis gas to provide some of the heat needed for the reactor chamber 108, in addition to the production of carbon black and pyrolytic oil with a high calorific value.

Figure 3:
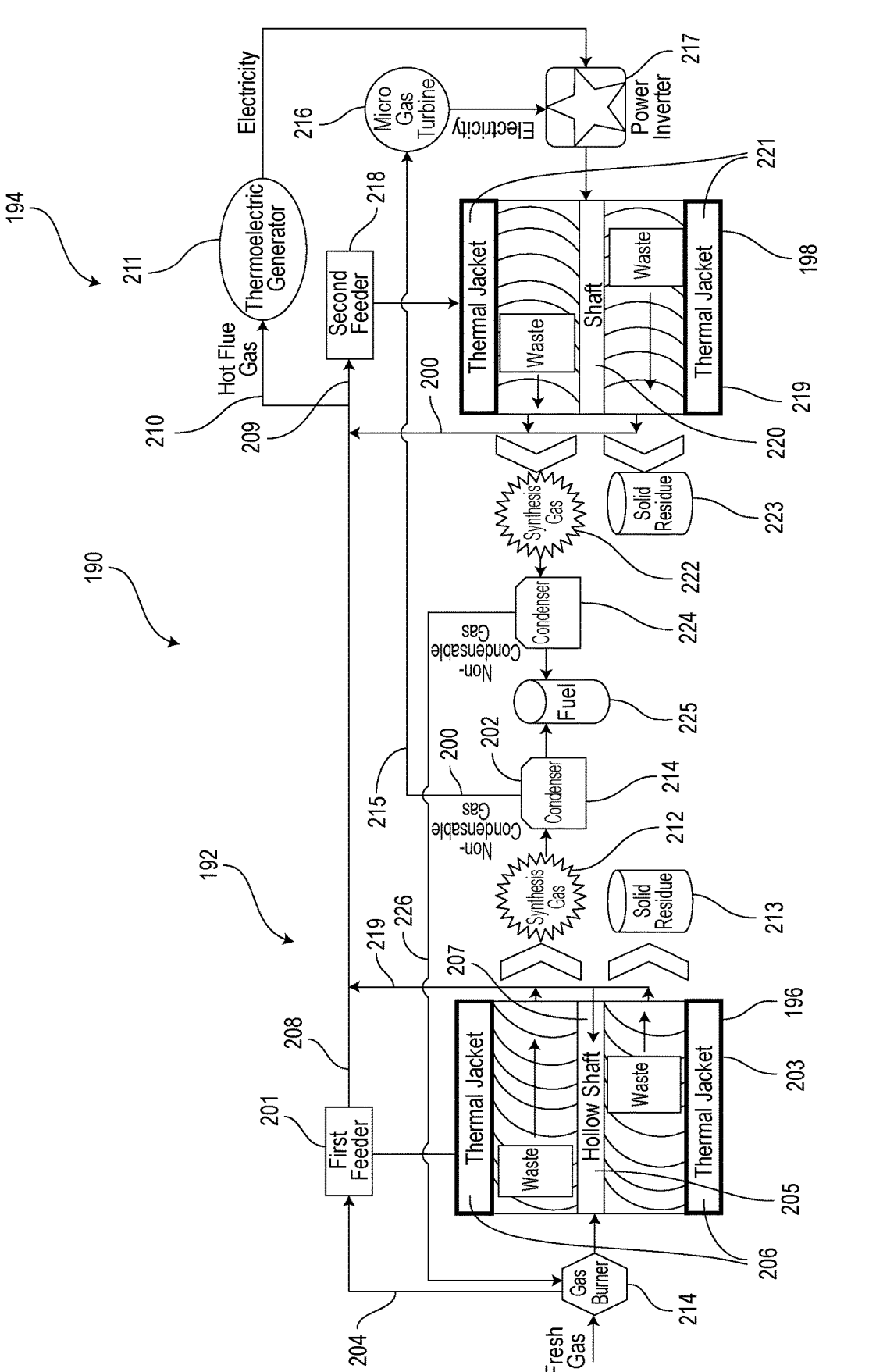
FIG. 3 is a block diagram of a pyrolysis system comprising a first pyrolysis reactor and a second pyrolysis reactor operating in series, in which the first pyrolysis reactor is heated by combustion of a fuel in a burner and the second pyrolysis reactor is heated by electricity generated from hot air and a synthesis gas exiting the first pyrolysis reactor.

In FIG. 3, a block diagram of a pyrolysis system, generally referred to as 190 with two pyrolysis reactors, generally referred to as 192 and 194 operating in series is shown, in which a first reactor chamber 196 is heated by combustion of a fuel in a burner and a second reactor chamber 198 is heated by electricity generated from hot gas 219 and a non-condensable synthesis gas 200 exiting the condenser 202 of the first pyrolysis reactor 192. The system 190 consists of the following main modules: the first reactor chamber 196, the second reactor chamber 198, a first feeder 201 connected to the first reactor chamber 196, a second feeder 218 connected to the second reactor chamber 198, two condensers 202 and 224, two cooling systems for reducing the temperature of solid residues 213 and 223, a thermoelectric generator 211, a micro-gas turbine 216, and a power inverter 217. The details of each pyrolysis reactor 192, 194 are as for FIG. 1, except for the heating sources and the lack of collection vessels, and the thermoelectric generator and micro-gas turbine in the second pyrolysis reactor 194.

In the pyrolysis system shown in FIG. 3, in one embodiment, fossil fuel is the primary fuel to heat the first reactor chamber 196. After the first reactor chamber 196 is operated, the hot gas 219 and the synthesis gas 212 produced are used to generate electricity, and then the second reactor chamber 198 starts working. Thus, the heat energy produced is converted into electricity and reused in the system.

The first feeder 201 includes a hopper, a hot gas dryer and a screw conveyor. Primary drying of waste requires energy consumption. In a first run of pyrolysis, this energy is supplied by a gas burner 214 from path 204. The waste is dried to a predetermined level. Then the waste is fed into the first reactor chamber 196. The gas burner 214 also supplies heat to the first reactor chamber 196, which includes a thermal jacket 206. As a result of the pyrolysis reaction carried out in the first reactor chamber 196, the waste is decomposed into the synthesis gas 212, hot gas 219 and solid residue 213. A rotary valve is used to prevent entry of oxygen into the first reactor chamber 196, so that the thermal decomposition of the waste can take place without the presence of oxygen. The hot air produced in the first reactor chamber 196 can be used in several different ways as follows:

Route 207: A portion of the hot gas 219 is passed as a hot fluid through a hollow shaft 205 in the first reactor chamber 196. This hot gas 219 is directed to a blade extending around the hollow shaft 205, and then to the waste. Also, the hot gas 219 is transferred from the hollow shaft 205 to the thermal jacket 206 to preserve the heat in the first reactor chamber 196. Therefore, in addition to improving heat transfer to the waste, the possibility of residues sticking to the blade is reduced or eliminated. Furthermore, proper mixing of the waste is also provided.

Route 208: Another portion of the hot gas 219 enters the first feeder 201, reducing the need to supply energy through the burner 214.

Route 209: Another portion of the hot gas 219 enters the second feeder 218 to preheat waste that is fed into the second reactor chamber 198.

Route 210: Another portion of the hot gas 219 is transferred to the thermoelectric generator 211. Due to the temperature difference between junctions of two dissimilar metals in a closed circuit, an electromotive force (EMF) is generated. The electromotive force creates an electrical current in the circuit. Then electricity generated by the thermoelectric generator 211 enters the power inverter 217.

The first reactor chamber 196 includes an auger for conveying the waste from an inlet to an outlet. Mechanisms of loading of the waste into the first reactor chamber 196 and of unloading of the solid residue 213 of the pyrolysis reaction are similar to each other, in which each of these mechanisms comprises a rotary valve. As a result of the pyrolysis reaction, the waste is decomposed into the solid residue 213, hot gas 219 and the synthesis gas 212. After the synthesis gas 212 enters the condenser 224, a non-condensable part of the synthesis gas 200 is directed through route 215 to the micro-gas turbine 216 to generate electricity. Then the generated electricity enters the power inverter 217. Electricity generated from the route 210 along with electricity generated from the route 215 can heat the second reactor chamber 198 and rotate a shaft 220. In this way, the second reactor chamber 198 starts working with a reduced need for electrical energy to be supplied from outside the system.

The second reactor chamber 198 includes a thermal jacket 221 and an auger, which is for conveying the waste from an inlet to an outlet. As a result of a pyrolysis reaction carried out in the second reactor chamber 198, the waste is decomposed into a synthesis gas 212, hot gas 219 and the solid residue 223. Loading and unloading mechanisms of the second reactor chamber 198 are similar to the loading and unloading mechanisms of the first reactor chamber 196. The synthesis gas 212 obtained from the second reactor chamber 198 enters the condenser 224 and a non-condensable part of the synthesis gas 200 is directed through pipe 226 to the burner 214. As a result, the thermal energy needed to operate the first reactor chamber 196 in the next run of pyrolysis is supplied, reducing the need to use a fresh gas in the burner 214.

Finally, the condensed synthesis gas leaving the condensers 202 and 224 is collected and stored in a tank, which can be used as a liquid fuel 225 for various applications.

Figure 4:
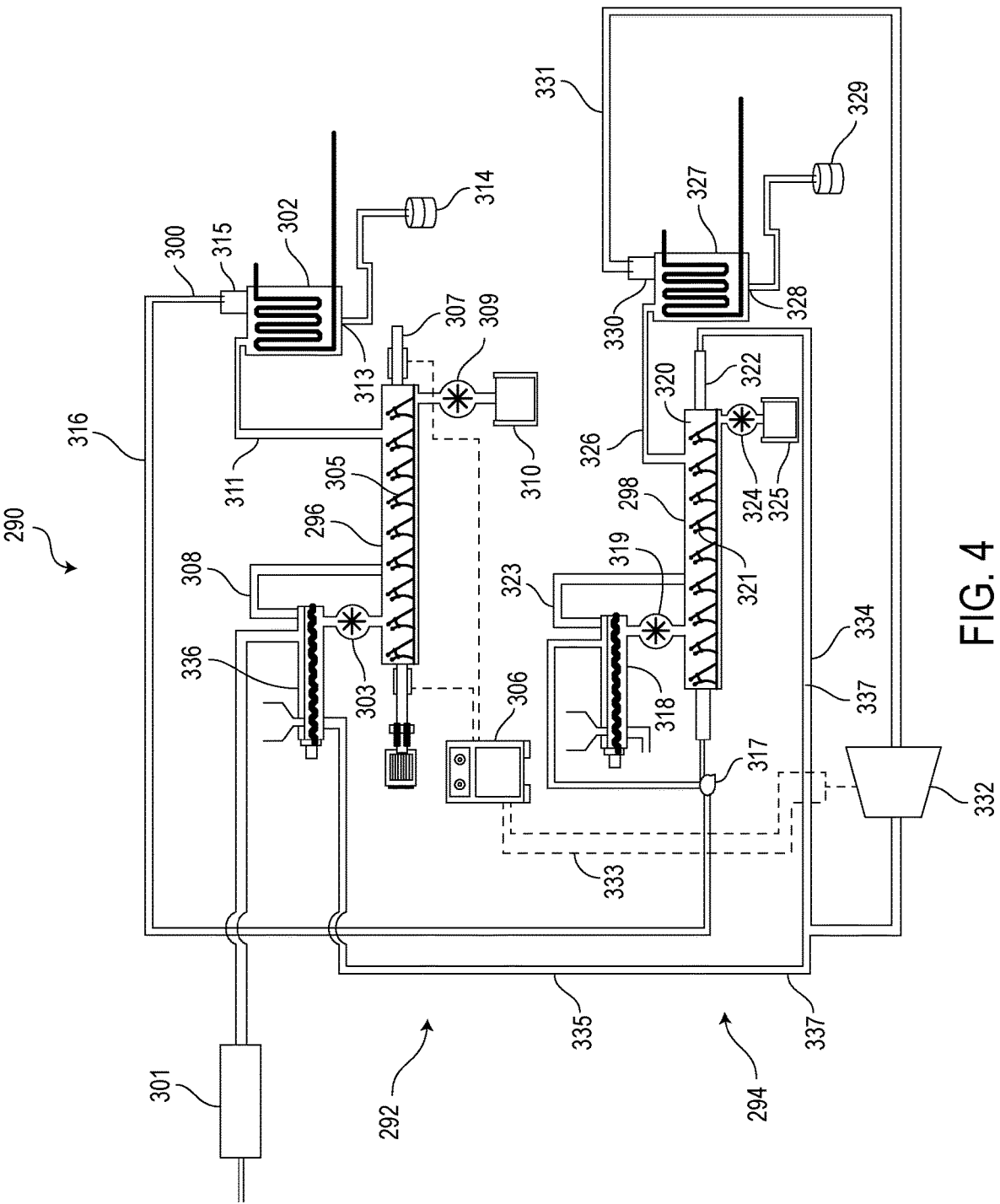
FIG. 4 is a schematic view of a pyrolysis system comprising a first pyrolysis reactor and a second pyrolysis reactor operating in series, in which the first pyrolysis reactor is heated by electricity and the second pyrolysis reactor is heated by combustion of a synthesis gas produced from the first pyrolysis reactor.

FIG. 4 shows a schematic view of a pyrolysis system, generally referred to as 290 with two pyrolysis reactors, generally referred to as 292 and 294 operating in series, in which a first reactor chamber 296 is heated by electricity and a second reactor chamber 298 is heated by combustion of the non-condensable synthesis gas 300 obtained from the condenser 302 of the first pyrolysis reactor 292. In FIG. 3, in one embodiment, the consumer could only use fossil fuels as a primary fuel to heat the first reactor chamber 196.

The general performance of the first reactor chamber 296 and the second reactor chamber 298 is similar to each other, but their heating energy sources are different. The energy required to heat the first reactor chamber 296, which includes an auger 305 having a shaft 307, is supplied by electricity. In this case, at least one end of the shaft 307 is connected to a power supply 301. Meanwhile, the energy required to heat the second reactor chamber 298, which includes an auger 321 with a hollow shaft 322 is supplied by the combustion, in a burner 317, of the non-condensable synthesis gas 300 obtained from the first condenser 312. In addition, the hot gas 320 produced in the second reactor chamber 298 helps to improve heat transfer and to mix shredded solid waste homogeneously without sticking to a blade extending around the hollow shaft 322. The details of each pyrolysis reactor are as for FIG. 1, except for the heating sources, the lack of collection vessels, the pipe 316 extending from the condenser 312 of the first pyrolysis reactor 292 to the hollow shaft 322 of the second reactor chamber 298 of the second pyrolysis reactor 294 and the thermoelectric generator 332 in the second pyrolysis reactor 294.

Briefly, each of the reactor chambers 296 and 298 include a tank in the form of a horizontally elongated hollow body. Rotary valves 303 and 319 are used to prevent entry of oxygen into the first reactor chamber 296 and the second reactor chamber 298, respectively. Each of the reactor chambers 296, 298 include a thermal jacket to minimize heat loss and save energy.

As a result of a pyrolysis reaction carried out in the first reactor chamber 296, shredded solid waste is decomposed into a solid residue, hot gas 320 and the synthesis gas. The solid residue is removed from the first reactor chamber 296 through a rotary valve 309 and is collected in a tank 310. The synthesis gas is directed from a top end of the first reactor chamber 296 to a condenser 312 via a synthesis gas outlet 311. A pyrolytic oil is removed from a bottom end 313 of the condenser 312 and is collected in a tank 314. The non-condensable synthesis gas 300 is removed through an outlet 315 located at a top of the condenser 312 and is sent via a pipe 316 to a fuel burner 317 of the second pyrolytic reactor 294.

As a result of a pyrolysis reaction carried out in the second reactor chamber 298, the shredded solid waste is decomposed into a solid residue, hot gas 320 and a synthesis gas. The solid residue is removed from the second reactor chamber 298 through a rotary valve 324 and finally is collected in a tank 325. The synthesis gas is directed from a top end 326 of the second reactor chamber 298 to a condenser 327. A pyrolytic oil is removed from a bottom end 328 of the condenser 327 via an outlet 326 and is collected in a tank 329. The non-condensable synthesis gas 300 is removed through a non-condensable synthesis gas outlet 330 located at a top of the condenser 327 and is sent via pipe 331 to a micro-gas turbine 332.

In order to reuse thermal energy produced in the system, the following routes are considered:

Route (I): The non-condensable synthesis gas 300 obtained from the first condenser 312 enters the burner 317 and through combustion of the non-condensable synthesis gas 300, heat is transferred to a second feeder 318 and to the second reactor chamber 298.

Route (II): The non-condensable synthesis gas 300 obtained from the second condenser 327 is directed through a pipe 331 to a micro-gas turbine 332 to generate electricity. Then the generated electricity enters a power inverter 306. A connection for the transmission of electric power is shown schematically with a dotted line 333. Therefore, the electrical energy needed to operate the first reactor chamber 296 in the next run is supplied. Finally, by heating the first reactor chamber 296, a synthesis gas is produced from pyrolysis of shredded solid waste, and a cycle of converting the solid waste into a fuel continues while reducing the need for external energy supply.

Route (III): In addition, a portion of hot exhaust gas 337 of the micro-gas turbine 332 is transferred through a pipe 335 to a first feeder 336 of the first pyrolytic reactor 292, so at least a portion of the energy necessary to preheat the solid waste is provided. It should be noted that preheating the shredded solid waste in the first run of the pyrolysis process is done by connecting the first feeder 336 to the power supply 301.

Route (IV): Another portion of the hot exhaust gas 337 of the micro-gas turbine 332 is directed through a pipe 334 to the hollow shaft 322 of the second reactor chamber 298 to save heat and also to improve energy efficiency in the system.

Route (V): In order to save energy, hot gas 320 produced in the first reactor chamber 296 is used to preheat the shredded solid waste through a connection 308 for the next run of pyrolysis.

Route (VI): In order to save energy, the hot gas 320 coming out of the second reactor chamber 298 is used to preheat shredded solid waste through a connection 323 to the second feeder 318 for the next run of pyrolysis.

Another embodiment provides a pyrolysis process of waste using a reactor equipped with a hybrid heating system, which is heated by electricity or burning fossil fuels at first, and after the thermal decomposition of plastic waste, it is heated by burning a synthesis gas leaving the pyrolysis reactor or by electricity generated from this gas, resulting in optimization of energy consumption. The pyrolysis reactor overcomes the problem of access to energy depending on local conditions. It is heated by hydrocarbon fuels wherever they are available, and it is heated by electricity wherever it is not possible to use hydrocarbon fuels.

Feedstock for the pyrolysis reactor is generally plastic waste. However, this technology may be used to treat other wastes not included in the above definition. The pyrolysis reactor presented in this technology can have different customers depending on the dimensions and capacity. Municipalities and waste disposal centers can be customers of high-capacity reactors (300-3000 kg/h). Smaller capacities of this reactor (up to 300 kg/h) can be utilized in residential houses to recycle their waste.

Figure 5:
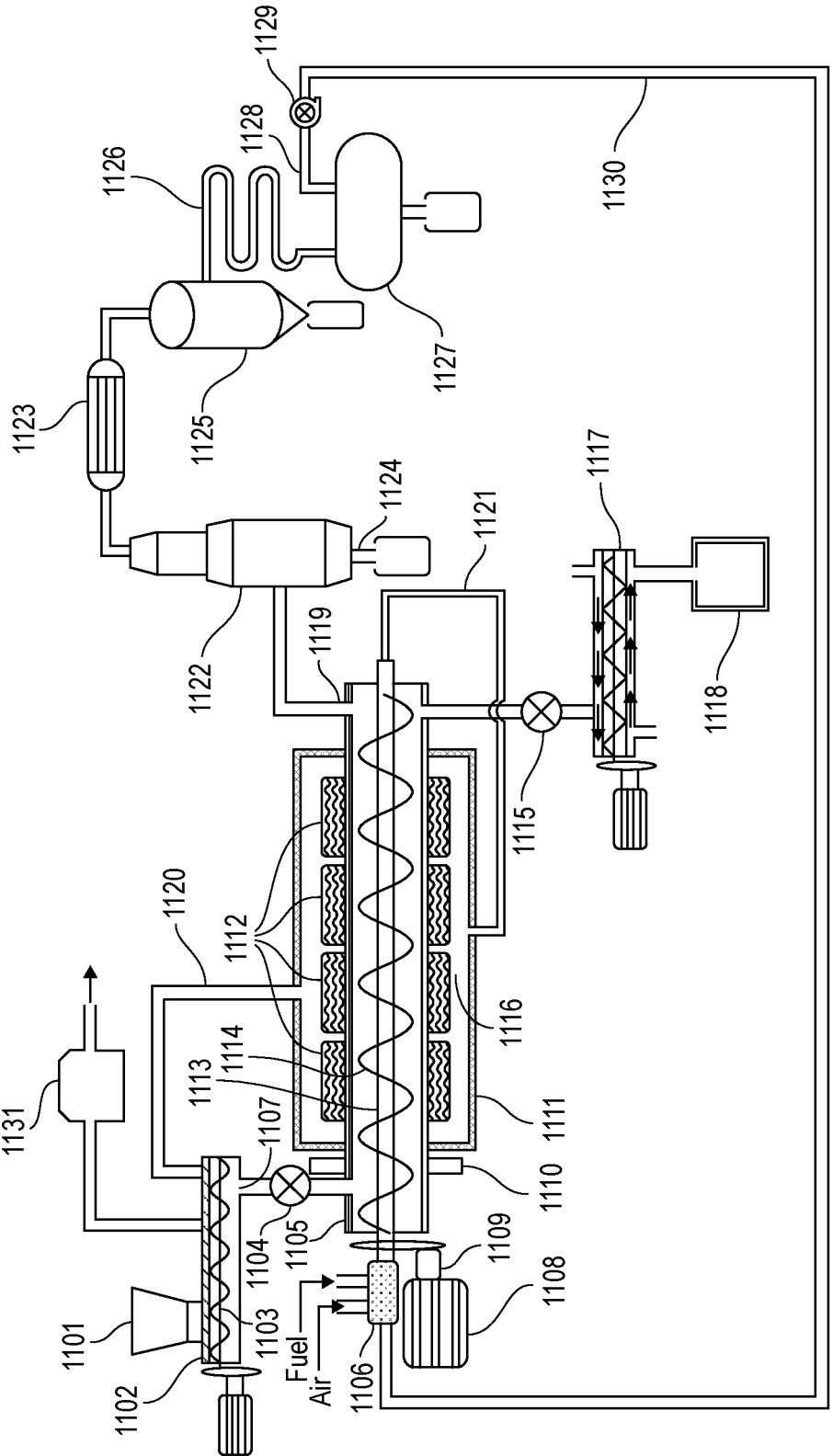
FIG. 5 is a schematic view of an alternative embodiment pyrolysis reactor in which the reactor chamber is initially heated by electrical elements or by burning fossil fuels, and then is heated by a synthesis gas produced in the pyrolysis reactor.

FIG. 5 shows a schematic view of another embodiment of a pyrolysis process of waste using a pyrolysis reactor that includes a reactor chamber 1105 that is initially heated by electrical elements 1112 located on an outer wall of the reactor 1105 or by burning fossil fuels in a gas burner 1106, and then is heated by a synthesis gas produced in the reactor chamber 1105.

Solid waste must first be crushed into smaller particles before entering the reactor chamber 1105. Depending on the type of waste and its heat capacity, an appropriate shredder is selected to shred the solid waste. In order to simplify the present technology, the pyrolysis process of plastic waste is described.

First, shredded plastic waste enters a feeder 1102 consisting of a hopper 101 and a screw conveyor 1103. The shredded plastic waste is preheated while being transferred along the length of the screw conveyor 1103, so that the energy needed to preheat the shredded plastic waste is supplied by electricity. The shredded plastic waste is preheated in the feeder 1102 to a temperature close to 100° C. The shredded plastic waste is passed through the screw conveyor 1103 to reach an outlet 1107 and finally enters the reactor chamber 1105 through a rotary valve 1104. The rotary valve 1104 is used to direct the shredded plastic waste from upstream to downstream, thus preventing oxygen from entering the reactor chamber 1105. The reactor chamber 1105 is insulated by a thermal jacket 1111 to minimize heat loss and save energy.

The reactor chamber 1105 comprises a screw for conveying the shredded plastic waste from an inlet to an outlet. The screw comprises a hollow shaft 1113 and a helical flight 1114 arranged about the hollow shaft 1113 and extending between two ends of the hollow shaft 1113. Mechanisms of loading the waste into the reactor chamber 1105 and of unloading a solid residue from the reactor chamber 1105 are similar to each other, in which each of these mechanisms comprises a rotary valve.

In the present technology, in order to make the maximum use of energy produced during the process, excess heat generated within a cylindrical space 1116 between the reactor chamber 1105 and the thermal jacket 1111 is used to preheat the shredded plastic waste. For this purpose, after operating the reactor chamber 1105, the excess heat is transferred into the feeder 1102 through a connection 1120. The excess heat exiting from the connection 1120 absorbs the moisture of the plastic waste inside the feeder 1102. An extractor fan is used to extract the moisture from the feeder 1102.

Depending on the type of waste, the temperature of the reactor chamber 1105 is set in the range of 400° C. to 800° C. The residence time of the shredded plastic waste inside the reactor chamber 1105 depends on the type of the waste and the rotation speed of the screw, and takes from a few minutes to several tens of minutes. To prevent the transfer of heat to the inlet of the reactor chamber 1105 and to bearings, a water cooling jacket 1110 is introduced by continuous flow of running water. This cooling jacket 1110 is used to prevent temperature rise in the inlet of the reactor chamber 1105 to ensure that the shredded plastic waste does not begin decomposing prematurely, avoiding stickiness of the shredded plastic waste that may cause clogging of the inlet.

One end of the hollow shaft 1113 is connected to a gearbox unit 1109 and a motor 1108. A set of temperature sensors are used to monitor and control the temperature during the process. To optimize energy consumption and improve heat transfer in the reactor chamber 1105, the reactor chamber 1105 is lined on its inside by a refractory material, so that in addition to conduction, the heat transfer due to radiation also causes further heating of the shredded plastic waste.

As a result of a pyrolysis reaction occurring inside the reactor chamber 1105, the shredded plastic waste is decomposed into a solid residue (char) and a synthesis gas (syngas). The syngas has a high calorific value and can be used as a fuel. The solid residue is not only a good fuel, but it can also be processed into carbon black. In addition, the solid residue can be used as a soil improver to increase the availability of nutrients for plants.

A rotary valve 1115 removes the solid residue obtained from the thermal decomposition of the shredded plastic waste from the reactor chamber 1105. Since the temperature of the solid residue exiting the reactor chamber 1105 is still high, this solid residue is fed to a cooling screw 1117. The cooling screw 1117 helps to rapid cooling of the solid residue, so that it is cooled down to room temperature. The solid residue is collected and stored in a storage tank 1118.

The syngas exiting the reactor chamber 1105 is passed through a catalyst tower 1122, a condenser 1123, and then a buffer tank 1125. An outlet pipe 1119 located at a top end of the reactor chamber 1105 directs the syngas from the reactor chamber 1105 to the catalyst tower 1122. In the catalyst tower 1122, higher molecular weight hydrocarbons produced from pyrolysis of the shredded plastic waste are broken down into lower molecular weight hydrocarbons. In fact, one of the main purposes of using catalysts is to shorten the carbon chain length of the pyrolysis products and thus to decrease the boiling temperature of the products. An outlet valve 1124 is located at the bottom of the catalyst tower 1122 to discharge wax (or sludge). The condenser 1123 is used to separate condensable components of the syngas. As the syngas enters the condenser 1123, it is cooled through tubes in which cooling water is circulated. Output of the condenser that comprises a liquid fraction and a gas fraction (condensable and non-condensable parts of the syngas) enters the buffer tank 1125 to reduce the flow speed of the gas fraction and settle the liquid fraction. The liquid fraction is removed from the bottom of the buffer tank 1125.

The remaining syngas is passed through a cooling system 1126 to separate a liquid fraction that is not condensed in the condenser 1123 and has a lower boiling point, from non-condensable gas and then enters a separator 1127. Finally, the non-condensable gas is removed from the separator 1127 through an outlet 1128 to use this gas in the pyrolysis process. The non-condensable gas is used as a fuel to heat the reactor 1105 and to implement the process. A suction fan 1129 is used to draw out the non-condensable gas from the separator 1127. The non-condensable gas is passed through a pipe 1130 and enters directly into an inlet of the gas burner 1106 and then is burned in the presence of air and passed as a hot gas (also known as hot flue gas) through the hollow shaft 1113. Therefore, the heat required for the pyrolysis process is supplied, so that there is no need to use fresh gas as a fuel in the burner 1106.

In fact, the reactor chamber 1105 is initially heated by an external energy source (electrical elements or a fossil fuel) and after the syngas is produced in sufficient quantities, it is heated by burning the syngas in the gas burner 1106.

The hot gas exiting the hollow shaft is directed through a pipe 1121 into the cylindrical space 1116 between the reactor chamber 1105 and the thermal jacket 1111 to preserve heat, and thereafter is transferred to the feeder 1102 through the connection 1120. Circulation of the hot gas from the hollow shaft 1113 to the cylindrical space 1116 helps to improve heat transfer in the reactor chamber 1105. Moreover, enhanced heat transfer can significantly decrease the rate of coke formation.

The hot gas is then passed through a scrubber 1131, in which the hot gas is subjected to a liquid (e.g., soda) to remove particulate and gaseous pollutants, before venting into the atmosphere.

Figure 6:
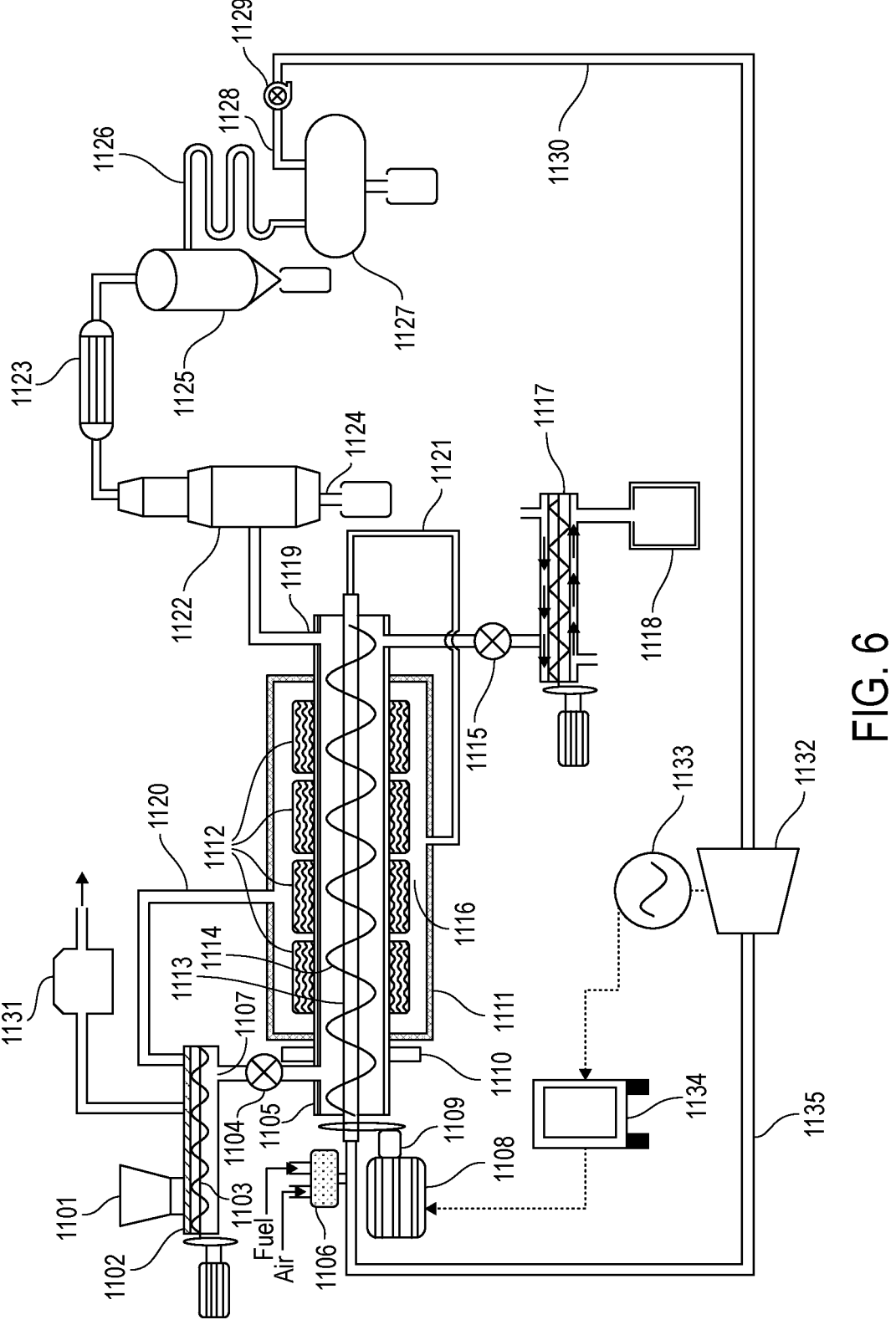
FIG. 6 is a schematic view of an alternative embodiment pyrolysis reactor in which the reactor chamber is initially heated by electrical elements or by burning fossil fuels, and then is heated by electricity generated from a synthesis gas produced in the pyrolysis reactor.

FIG. 6 shows a schematic view of a pyrolysis process of waste using the reactor chamber 1105 that is initially heated by electrical elements 1112 located on the outer wall of the reactor chamber 1105 or by burning fossil fuels, and then is heated by electricity generated from a syngas produced in the reactor chamber 1105. The general performance of the pyrolysis process in FIG. 6 is similar to that shown in FIG. 5, except that the syngas produced in the reactor chamber 1105 is converted into electricity. This electric energy is then used to heat the reactor chamber 1105 by means of the electrical elements 1112.

As described in FIG. 5, thermal decomposition of plastic waste takes place in the reactor chamber 1105, and a syngas and a solid residue are produced. This syngas is passed through the catalyst tower 1122, condenser 1123, buffer tank 1125, and cooling system 1126, respectively, and finally, a non-condensable gas enters the separator 1127. The suction fan 1129 is used to draw out the non-condensable gas from the separator 1127. The non-condensable gas is directed to a micro-gas turbine 1132 and then a generator 1133 to generate electricity. A power inverter 1134 is utilized to change and control the voltage and frequency. The micro-gas turbine 1132 converts the non-condensable gas into mechanical energy. This energy then drives the generator 1133 that produces electrical energy needed for electrical elements 1112 located on the reactor wall. Moreover, hot exhaust gas from the micro-gas turbine 1132 can be used for heating the reactor chamber 1105. Therefore, the hot exhaust gas is directed through a pipe 1135 into the hollow shaft 1113 and then into the cylindrical space 1116 between the reactor chamber 1105 and the thermal jacket 1111 to preserve heat. Thereafter, the hot exhaust gas is transferred to the feeder 1102 through the connection 1120. Finally, the hot exhaust gas is passed through the scrubber 1131 before venting into the atmosphere.

The present technology opens up a perspective on the field of energy and renewable fuels. The pyrolysis process described in this technology is relatively simple and adaptable to a wide variety of feedstocks, and at the same time overcomes the drawbacks of conventional pyrolysis methods, like high fuel consumption. In the present technology, it is possible to save energy by burning the synthesis gas or by electricity generated from this gas to provide the heat needed for the pyrolysis reactor, in addition to the production of carbon black and pyrolytic oils with a high calorific value. These oils can be used as a suitable alternative energy source in various industries.

It will be apparent to one with skill in the art that the pyrolysis system of the technology may be provided using some or all of the mentioned features and components without departing from the scope of the present technology. It will also be apparent to the skilled artisan that the embodiments described above are specific examples of a single broader technology which may be many alterations made in the descriptions without departing from the scope of the present technology.

The invention claimed is:

1. A method of pyrolyzing shredded solid waste, the method comprising:
   selecting a hybrid heat pyrolysis reactor, which includes: a heater; a feeder which is in communication with the heater; a reactor chamber, which is connected to the feeder and includes walls with a refractory liner, a waste inlet, a solid residue outlet, a synthesis gas outlet pipe, a heated gas outlet, and an auger, which includes a shaft configured for heating the shredded solid waste; a condenser which includes a pyrolytic oil outlet and a non-condensable synthesis gas outlet; a collection vessel in fluid communication with the non-condensable synthesis gas outlet; a pipe in fluid communication with the collection vessel; a fuel burner in fluid communication with the pipe and the reactor chamber; and a heated gas supply duct which is in fluid communication with the heated gas outlet and the feeder;
   heating the shredded solid waste in the feeder with the heater to provide heated shredded solid waste;
   loading the heated shredded solid waste into the reactor chamber through the waste inlet;
   pyrolyzing the heated shredded solid waste in the reactor chamber to provide pyrolyzed solid waste; and
   concomitantly separating synthesis gas and solid residue into two streams from the pyrolyzed solid waste, condensing the synthesis gas in the condenser to provide pyrolysis oil and non-condensable synthesis gas, sending the heated gas from the hot gas outlet to the feeder via the heated gas supply duct; and sending the non-condensable synthesis gas to the fuel burner, thereby pyrolyzing shredded solid waste.

2. The method of claim 1, further comprising pyrolyzing shredded solid waste in subsequent runs, the method comprising:

heating the shredded solid waste in the feeder with gas from the reactor chamber to provide heated shredded solid waste;

loading the heated shredded solid waste into the reactor chamber through the waste inlet;

sending the non-condensable synthesis gas to the fuel burner;

pyrolyzing the heated shredded solid waste in the reactor chamber with the fuel burner to provide pyrolyzed solid waste; and concomitantly separating synthesis gas and solid residue into two streams from the pyrolyzed solid waste, condensing the synthesis gas in the condenser to provide pyrolysis oil and non-condensable synthesis gas, sending the gas from the heated gas outlet to the feeder via the heated gas supply duct and sending the non-condensable synthesis gas to the fuel burner, thereby pyrolyzing solid waste.

3. The method of claim 1, wherein the heating of the feeder is initially with an electric heater and thereafter with the gas from the heated gas outlet.

4. The method of claim 1, wherein the heating in the reactor chamber is initially electric heating and thereafter by burning the non-condensable synthesis gas in the fuel burner.

5. The method of claim 1, wherein the heating of the feeder is initially with a feeder fuel burner using an external fuel source.

6. The method of claim 1, wherein the shredded solid waste is continuously loaded in the feeder, the heated shredded solid waste is continuously loaded into the reactor chamber, the pyrolyzing the heated shredded solid waste is continuous and the concomitantly separating synthesis gas and solid residue into two streams from the pyrolyzed solid waste, condensing the synthesis gas in the condenser to provide pyrolysis oil and non-condensable synthesis gas is continuous.

7. The method of claim 6, wherein pyrolyzing is conducted at 400° C. to 800° C.

8. The method of claim 7, wherein the shredded solid waste is shredded plastic polymeric solid waste.

9. The method of claim 8, wherein the heating of the reactor chamber is via the auger which has a hollow bore in fluid communication with the fuel burner.

10. A method of pyrolyzing shredded solid waste, the method comprising:

selecting a system for pyrolyzing shredded solid waste, the system comprising a first pyrolysis reactor and at least a second pyrolysis reactor in series, each reactor including: a heater; a feeder which is in communication with the heater; a reactor chamber, which is connected to the feeder and includes walls with a refractory liner, a waste inlet, a solid residue outlet, a synthesis gas outlet pipe, a heated gas outlet, and an auger, which includes a shaft configured for heating the shredded solid waste; a condenser which includes a pyrolytic oil outlet and a non-condensable synthesis gas outlet; a pipe in fluid communication with the non-condensable synthesis gas outlet; and a heated gas supply duct which is in fluid communication with the heated gas outlet and the feeder;

wherein in the first pyrolytic reactor, the shaft of the auger has a first end and a second end and the ends are attached to electrical connections, and the pipe is in fluid communication with a fuel burner of the second pyrolytic reactor; and wherein in the second pyrolysis reactor, the shaft of the auger is hollow and is in fluid communication with the fuel burner and the pipe is in fluid communication with the feeder of the first pyrolytic reactor;

heating the shredded solid waste in the feeders with the heaters to provide heated shredded solid waste;

loading the heated shredded solid waste into the reactor chambers through the waste inlets;

pyrolyzing the heated shredded solid waste in the reactor chambers with the shafts to provide pyrolyzed solid waste; and concomitantly separating synthesis gas and solid residue into two streams from the pyrolyzed solid waste, condensing the synthesis gas in each condenser to provide pyrolysis oil and non-condensable synthesis gas, sending the gas from the heated gas outlets to the feeders via the heated gas supply ducts; sending the non-condensable synthesis gas from the first pyrolysis reactor to the fuel burner of the second pyrolytic reactor, and the fuel burner heating the hollow core of the auger of the second pyrolysis reactor, thereby pyrolyzing solid waste.

11. The method of claim 10, wherein the heating of at least one feeder is with an electric heater.

12. The method of claim 10, wherein the heating of at least one feeder is with a fuel burner.

13. The method of claim 10, wherein the heating of the shredded solid waste in the feeders is at 80° C. to at least 100° C.

14. The method of claim 10, wherein the heating in the reactor chamber of the first pyrolysis reactor is electric heating with the shaft.

15. The method of claim 14, wherein powering the electric heating of the shaft of the reactor chamber of the first pyrolysis reactor is by a thermoelectric generator or a micro-gas turbine of the second pyrolysis reactor.

16. The method of claim 10, wherein electrical powering the reactor chamber of the second pyrolysis reactor is by a thermoelectric generator or a micro-gas turbine of the second pyrolysis reactor.

* * * * *